United States Patent Office 3,002,698
Patented Oct. 3, 1961

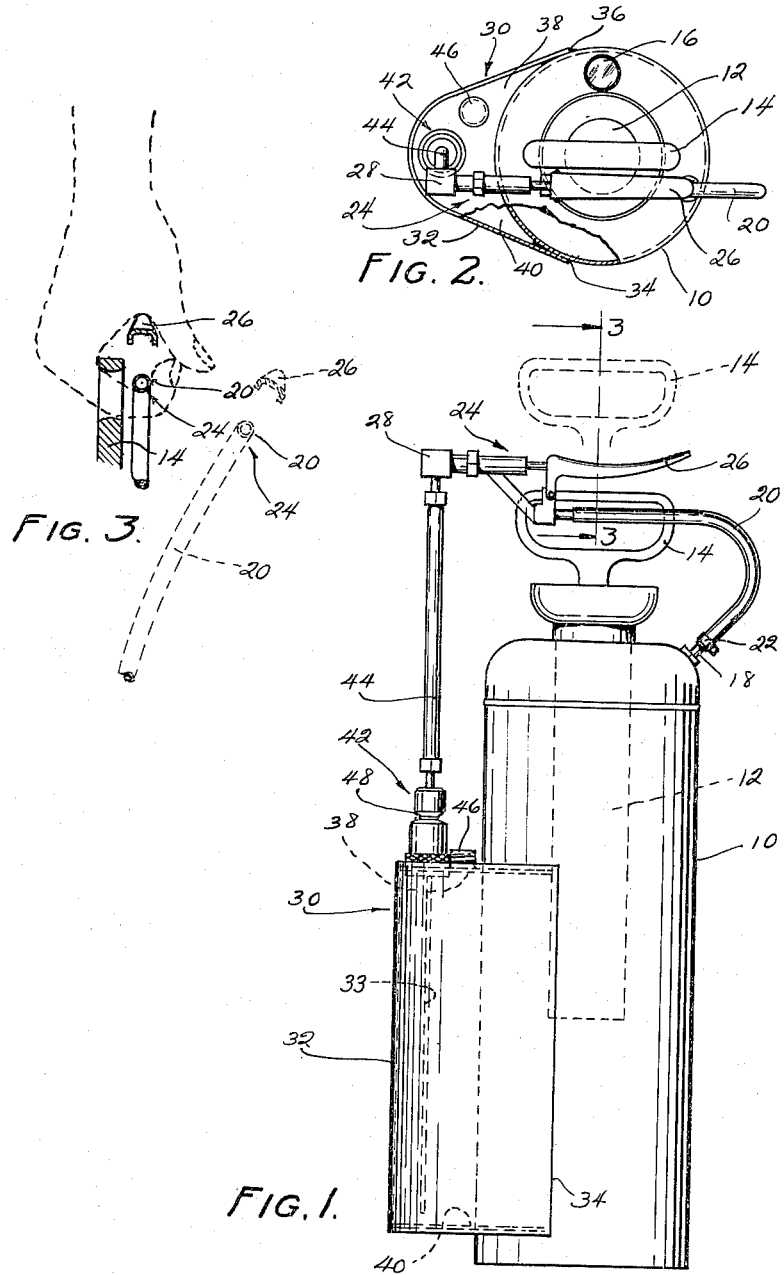

3,002,698
HAND PRESSURE SPRAYER
Michael S. Gallo, 1310 Forest St., Racine, Wis.
Filed Aug. 12, 1957, Ser. No. 677,475
2 Claims. (Cl. 239—308)

This invention relates to a sprayer and especially to a sprayer of the hand-type.

The conventional sprayer of this type is either carried by a so-called D handle that also functions as a pump handle, or it is carried on the operators shoulder by a strap. In either instance the spray nozzle is held and directed by one of the hands of the operator.

When using the conventional sprayer it is necessary to frequently stoop over when it is desired to spray the insecticide or other spray material under the leaves of shrubs and other plants. Many pests are found there.

This invention is believed to be novel in that one object thereof is to provide a hand pressure sprayer that requires only one hand for simultaneously carrying it and operating the valve.

Another object is to provide a hand sprayer that carries a spray-solution reservoir entirely exterior of the air pressure tank.

Another object is to provide a hand sprayer that permits spraying under low plants without requiring the operator to stoop.

Another object is to provide a hand sprayer having the parts so positioned that the control valve is encircled by the operator's hand as the sprayer is being carried.

Further objects and advantages of the invention will become apparent from a consideration of the following detailed description taken in connection with the accompanying drawing wherein a satisfactory embodiment of the invention is shown. However, it is to be understood that the invention is not limited to the details disclosed, but includes all such variations, and equivalents as fall within the spirit of the invention.

Referring to the drawing:

FIG. 1 is a side view in elevation of a hand pressure sprayer embracing this invention, and showing the combined pumping and carrying handle in the "up" position by dotted lines.

FIG. 2 is a plan view of the sprayer showing the top thereof and with a part removed to show the interior of the tank and the reservoir.

FIG. 3 is a section taken at 3—3 of FIG. 1 and showing the manner in which the hand carries the sprayer and simultaneously operates the control valve.

The sprayer comprises an air pressure tank 10 of the usual cylindrical shape and of a suitable capacity. A coaxial air pump 12 is provided having a D handle. Pump 12 is supplied with air by partially rotating handle 14, and pumping in the usual manner. When sufficient pressure has been stored the handle 14 is returned toward the tank and given a partial turn to lock it relative to the tank for carrying the latter.

An air gage 16 serves to indicate the pressure of the air in the tank 10.

An outlet fitting 18 is brazed or secured into tank 10, and a length of conduit or flexible tubing 20 of a suitable length is secured to fitting 18 by a hose clamp 22 as shown in FIG. 1.

A control valve 24 is positioned adjacent D handle 14 so that when the handle has been locked and the sprayer is being carried for spraying, the operator's hand encircles the valve handle 26 simultaneously. Thus a slight pressure on handle 26 actuates the spray nozzle.

Valve 24 extends toward the front on the tank 10 to a point overhanging the latter as shown in FIG. 1, and terminates in a junction portion 28 having a right-angled passageway, the purpose of which will later appear.

A novel feature of this invention is the location of the insecticide or spray solution reservoir 30 entirely on the exterior of the tank 10. Reservoir 30 is of the shape shown in FIGS. 1 and 2. FIG. 2 shows the shape of the reservoir and the manner of securing it to the tank 10. Reservoir 30 comprises a sheet metal shell 32 formed to the shape shown. The edges 34 and 36 are soldered or brazed to the tank 10 so as to provide a leak proof joint, or otherwise suitably mounted on the periphery 10. A top 38 and a bottom 40 are made a close fit within the formed sheet metal shell 32 and to the contour of tank 10, and which ends are also soldered or brazed about their peripheries to shell 32. The result being a spray solution reservoir secured or mounted to the tank 10 but having no interconnection or fluid passageway therebetween, except that to be described later.

A syphon spray head 42 of a type described in Patent 2,889,998, is suitably secured by threading into the top 38. This head 42 is provided with a syphon tube 33 shown in FIG. 1. With this head 42, the interior of reservoir 30 will be under atmospheric pressure.

A flexible conduit 44 is threaded into the upper end of head 42 as shown in FIG. 1, and is directed upwardly and threadedly engaged in junction portion 28.

An opening having a conventional screw cap 46 is provided in top 38 whereby the reservoir 30 can be supplied with the spray solution.

Spray head 42 is provided with an orifice at 48 which sprays the solution horizontally at a convenient height.

It will be clear from a study of FIGS. 2 and 3 that the hand carrying the sprayer by the handle 14 is also employed to actuate the handle 26 of valve 24, by simply applying suitable pressure downwardly on the handle 26. In this manner accurate control is obtained so that the spray solution is not wasted. When air is being pumped into tank 10 by use of pump handle 14, valve 24 is moved outwardly from the handle for a distance sufficient to clear the handle for unlocking the pump handle and reciprocating the latter, permitted because of the flexibility of the conduits 20 and 44.

The above being a complete description of an illustrative embodiment of the invention, what is claimed as new and desired to be secured by Letters Patent of the United States is:

1. A hand sprayer having an air tank, and a hand pump central therewith provided with a handle having a hand aperture, in combination a spray solution reservoir on the periphery of said tank, a spray head operatively associated with the air tank and reservoir, said spray head being secured in said reservoir and having a syphon means connected thereto, a control valve for controlling air flowing from said tank to said spray head having a handle positioned adjacent said aperture so as to permit actuating said valve simultaneously with the same hand that carries the sprayer, a conduit between said spray head and said valve for supplying air to said spray head, and a conduit between said tank and said valve for supplying air to said spray head through said valve.

2. A hand sprayer having an air tank and an upright hand pump therein provided with a handle having a horizontally-extending longitudinal hand aperture, in combination a spray solution reservoir, a spray head operatively associated with the air tank and reservoir, said spray head being secured in said reservoir and having a siphon means connected thereto, a control valve for controlling air flowing from said tank to said spray head having a handle positioned adjacent said aperture and horizontally coextensive therewith so as to permit actuating said valve simultaneously with the same hand that carries the sprayer, a conduit between said spray head and said valve for supplying air to said spray head, and a conduit between said tank and said valve for supplying air to said spray head through said valve.

References Cited in the file of this patent

UNITED STATES PATENTS

| | | | |
|---|---|---|---|
| 640,118 | Eck | Dec. 26, | 1899 |
| 688,261 | Parks | Dec. 3, | 1901 |
| 850,674 | Parks | Apr. 16, | 1907 |
| 951,625 | Wilbur | Mar. 8, | 1910 |
| 1,011,404 | Brandt | Dec. 12, | 1911 |
| 1,169,558 | Maul et al. | Jan. 25, | 1916 |
| 1,300,823 | Dickey | Apr. 15, | 1919 |
| 1,786,889 | Brandt | Dec. 30, | 1930 |
| 1,792,802 | Brandt | Feb. 17, | 1931 |
| 1,961,924 | De Frees | June 5, | 1934 |
| 2,529,645 | Winks et al. | Nov. 14, | 1950 |
| 2,782,072 | Stock et al. | Feb. 19, | 1957 |
| 2,892,317 | Holmes | June 30, | 1959 |